Patented Apr. 9, 1929.

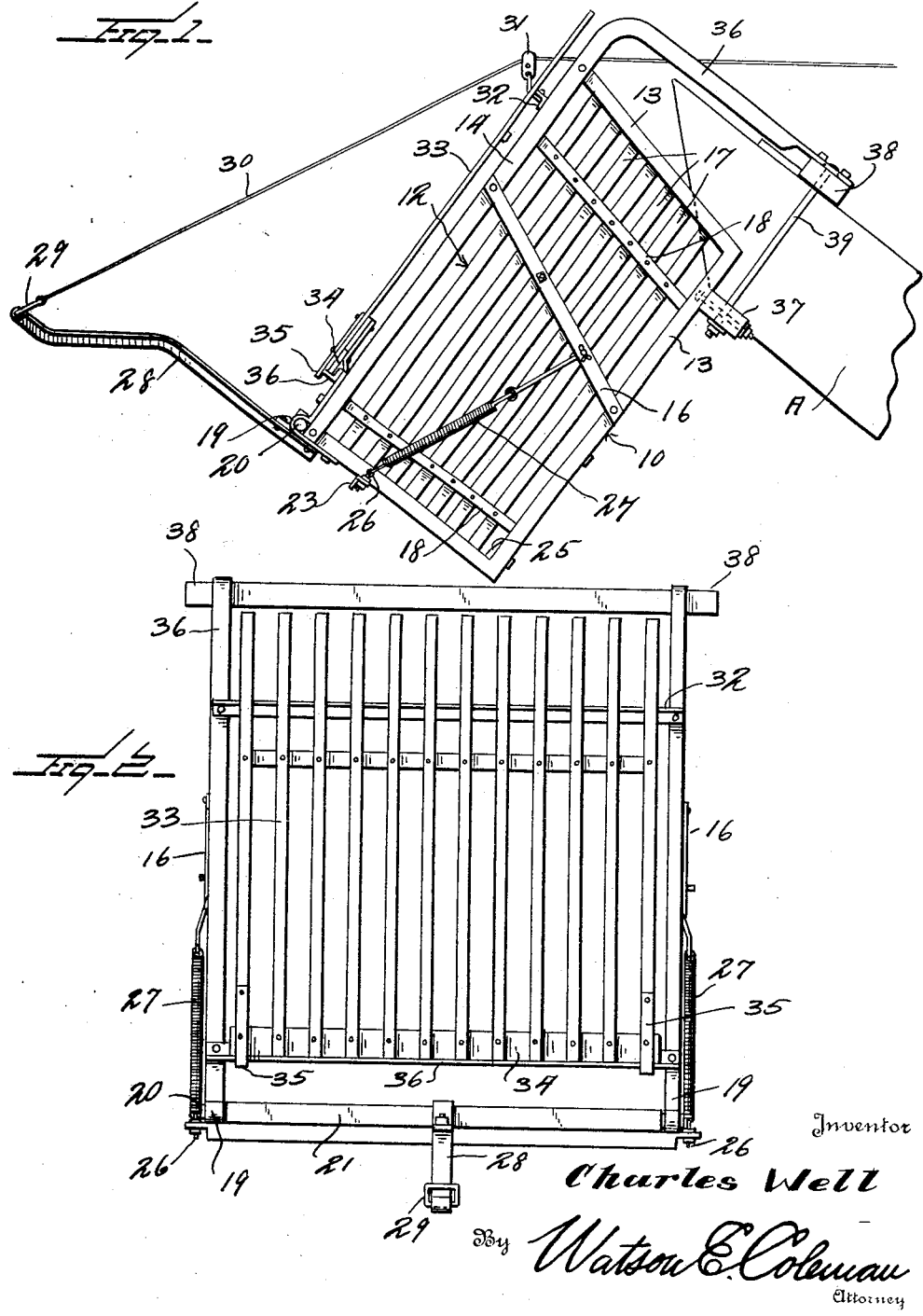

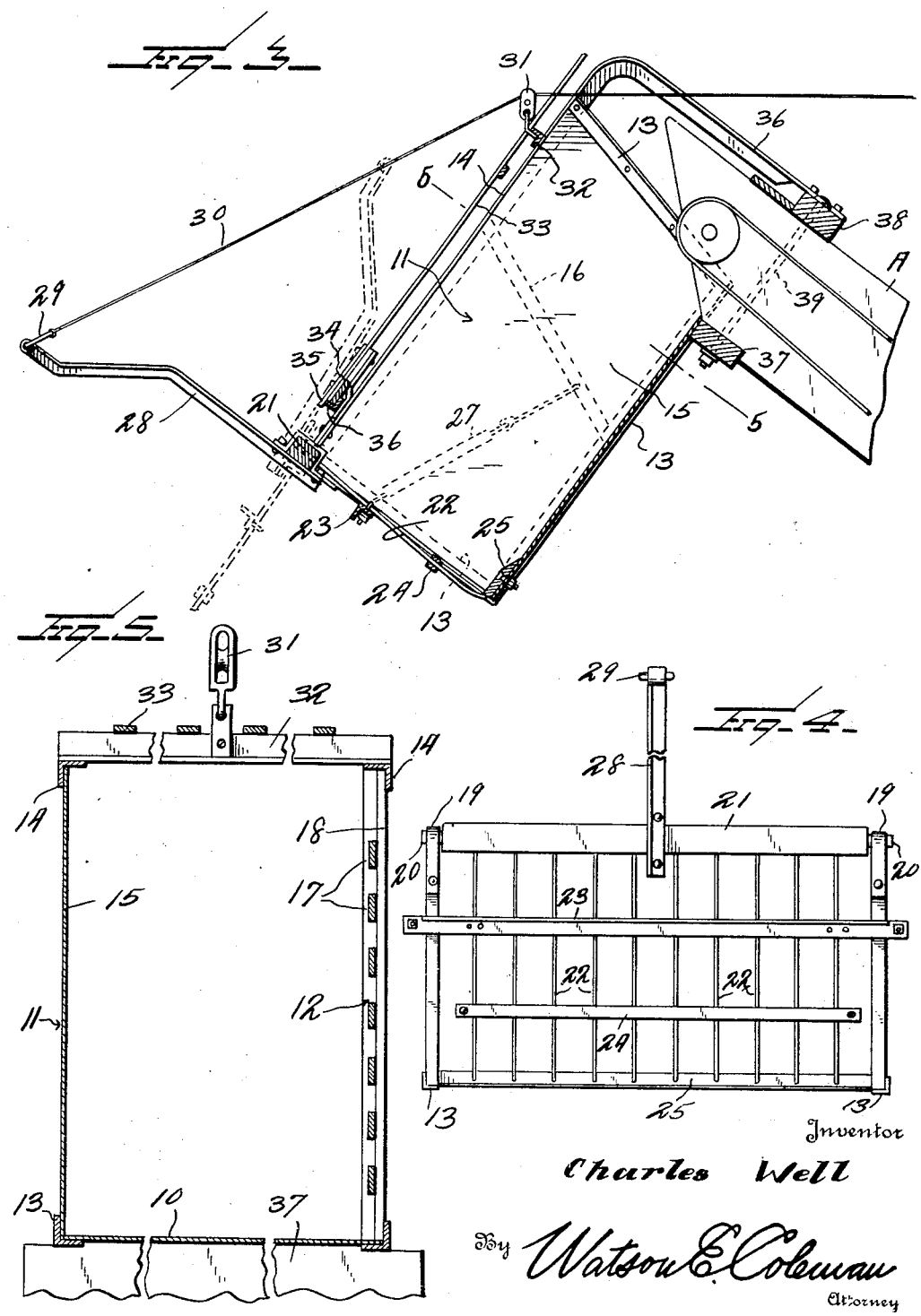

1,708,437

UNITED STATES PATENT OFFICE.

CHARLES WELL, OF LEMMON, SOUTH DAKOTA.

DUMPING ATTACHMENT FOR HARVESTERS AND HEADERS.

Application filed January 28, 1926. Serial No. 84,385.

This invention relates to harvesters or binders and headers and particularly to a dumping attachment designed to be disposed at and attached to the extremity of the elevator to receive loose grains, flax or alfalfa for seed and to dump the gathered mass at intervals at the will of the operator.

One of the objects of the present invention is to provide a device of this character which may be readily attached to any harvester or header elevator and which is provided with a dumping door normally held closed by springs but operable from time to time by the driver to discharge the contents of the dumping attachment.

A further object is to provide a dumping attachment of this character having one side slatted so as to permit the driver to observe the degree to which the dumping attachment is filled so that he may judge when it is best to operate the dumping gate to discharge the contents.

Other objects have to do with the details of construction and arrangement of parts as will appear more fully hereinafter.

My invention is illustrated in the accompanying drawings wherein:—

Figure 1 is a side elevation of a dumping attachment constructed in accordance with my invention in applied position;

Figure 2 is a top plan view of the attachment;

Figure 3 is a vertical sectional view showing the gate open in dotted lines;

Figure 4 is a front elevation of the attachment;

Figure 5 is a section on the line 5—5 of Figure 3.

With reference to the drawings it will be seen that my attachment comprises a trough-like structure formed to provide a bottom 10, the closed side wall 11, and the slatted side wall 12. The bottom 10 is formed preferably of sheet metal resting upon angle irons 13, these angle irons, as illustrated in Figure 3 being continued upward at the rear of the box and at the forward end thereof, and an angle iron 14 being attached to the upper ends of the forward and rearward portions of the angle iron 13 and connecting the same. The side wall 11 is formed by a panel 15 of sheet metal held in place in the angle iron frame 13 by means of bolts, rivets or the like. The upper member 14 and the lower member of the frame 13 are connected as regards the side 11 by means of a downwardly and forwardly extending brace 16. The opposite side wall of the box is constructed by a frame formed of the members 13 and 14 as previously described, and is also provided with longitudinally extending slats 17 attached to uprights 18 which in turn are attached to the angle irons of the frame. This permits the driver of the header or harvester to observe the degree to which this trough shaped container is filled.

Mounted upon the upper members 14 at their forward ends are the straps 19 formed to provide bearings for the trunnions 20 of the upper bar 21 of the gate. This gate is formed of the upper bar 21 and the downwardly extending tines 22 in the form of metal rods carried at their upper ends in the cross bar 21 and connected to an angle iron 23 and through a cross bar 24 disposed below the angle iron, these tines 22 at their lower ends normally rest against a transverse bar 25 which is riveted, bolted or otherwise attached to the bottom 10 as shown in Figure 3. The bar 23 extends beyond the side frames as shown in Figure 2, and passing through the ends of this bar 23 are the hooks 26 to which are connected the coil contractile springs 27 which at their rear ends are connected to the braces 16. Thus these springs act to urge the gate to its closed position. Attached to the upper cross bar 21 of the gate is an arm 28 which normally extends outward and upward with reference to the top of the dumping attachment and is connected by a link 29 to a light cable 30 which passes rearward and over a pulley 31 which is carried by an angle iron cross bar 32 riveted, bolted or otherwise attached to the members 14 of the side frames. The cable 30 from thence extends to a point adjacent the driver's seat and the driver can by pulling upon this cord open the gate to cause the discharge of the contents of the attachment. As soon as the strain is released on this cord, the springs 27 will act to close the gate.

The top of the dumping attachment is formed by a series of slats 33 which are connected by cross bars 34 and which at their lower ends are provided with metallic strips 35 disposed on each side of the cross bar 34 and these strips are adapted to extend above and below the transverse angle iron 36 attached to the member 14 and extending across the upper ends of the attachment. The upper ends of these slats rest upon the angle iron 32.

For the purpose of attaching the box formed by the sides 11 and 12 and the bottom 10 to the side boards A of the elevator I continue the angle iron 14 beyond the ends of the box or casing or, in other words, beyond the sides of the casing, this angle iron extending downward and rearward as at 36. Attached to the bottom 10 is a cross bar 37. The portions 36 of the angle irons 14 are engaged with a cross bar 38 which is disposed upon the upper edges of the conveyor walls A and bolted thereto. The cross bar 38 in turn is bolted by bolts 39 to the cross bar 37. Thus my attachment is clamped upon the discharge end of the elevator casing and extends downward and laterally therefrom.

In the use of this device it is applied to the elevator in the manner illustrated and the slatted side is disposed to face rearward that is, toward the driver so that the driver can see whenever the attachment is sufficiently filled with material to require dumping. When this occurs he simply pulls upon the cable 30 and lifts the discharge door and the material is dropped out of the dumping attachment on to the ground in a heap. In this condition the material dries.

The gate cover is removable in order to permit repairs and allow large sticks and obstructions such as sunflowers, Russian thistles and the like to be taken out. The object of the slatted top is to have open view as to its contents. The closed cover or sides are used to prevent trouble from wind while the device is filling. The gate springs are adjustable and the cord or rope 30 is adapted to be pulled either by hand or by foot trip action. The instantaneous action of the springs drops and leaves the dumped contents in a neat unscattered heap, conveniently picked up later and readily gathered, thus reducing the cost of thrashing.

While I have illustrated certain details of construction and arrangement of parts which I believe of particular value I do not wish to be limited to these details as they may be changed in many ways without departing from the spirit of the invention as defined in the appended claims.

I claim:—

1. A dumping attachment for harvesters comprising a receptacle having a frame, including top and bottom longitudinally extending bars, said bottom bars having each end turned to form a transverse end bar, each secured to a top bar, each of said top bars extending a substantial distance beyond one end of the receptacle and being turned to form a transverse arm terminating substantially in alinement with a bottom bar, that end of the receptacle adjacent the transverse arms being open, a cross bar connecting the bottom bars adjacent said open end, a cross bar between the ends of said arms, means for coupling said cross bars together to secure the discharge end of an elevator therebetween, and a gate controlling the outlet of material from the other end of the receptacle.

2. A dumping attachment for harvesters, comprising an elongated receptacle designed to be secured at one end to an elevator to receive material therefrom, a pivoted spring controlled gate closing the other end of the receptacle, a pair of angle bars secured across one open side of the receptacle, each of said bars having one flange thereof extending outwardly of the receptacle, and a removable gate comprising a base bar, a plurality of spaced parallel slats, each secured at one end to said base bar, and guide and retaining straps extending lengthwise of the gate and transversely of the base bar, across the upper and lower faces thereof, said base bar being designed to rest upon said outwardly extending flange of the lower one of said angle bars with said retaining straps extending over and under the angle bar for preventing disengagement of the base bar therefrom.

In testimony whereof I hereunto affix my signature.

CHARLES WELL.